United States Patent [19]
Oxford

[11] Patent Number: 5,826,819
[45] Date of Patent: Oct. 27, 1998

[54] WEAPON SYSTEM EMPLOYING A TRANSPONDER BOMB AND GUIDANCE METHOD THEREOF

[75] Inventor: Stephen C. Oxford, Los Angeles, Calif.

[73] Assignee: Raytheon Company, Lexington, Mass.

[21] Appl. No.: 883,941

[22] Filed: Jun. 27, 1997

[51] Int. Cl.⁶ ............................ F41G 7/00; G01S 13/00
[52] U.S. Cl. ........................................ 244/3.14; 342/62
[58] Field of Search ................................ 244/3.14, 3.11, 244/3.19; 342/62, 63, 67, 48

[56] References Cited

U.S. PATENT DOCUMENTS

| | | | |
|---|---|---|---|
| 3,856,237 | 12/1974 | Torian et al. | 244/3.14 |
| 4,100,545 | 7/1978 | Tabourier | 342/62 |
| 4,288,049 | 9/1981 | Alpers | 244/3.14 |
| 4,442,431 | 4/1984 | Bleakney | 244/3.14 |
| 4,589,610 | 5/1986 | Schmidt | 244/3.19 |
| 5,064,140 | 11/1991 | Pittman et al. | 244/3.14 |
| 5,281,973 | 1/1994 | Murphy, Jr. et al. | 342/62 |
| 5,379,966 | 1/1995 | Simeone et al. | 244/3.14 |
| 5,473,331 | 12/1995 | Kennedy et al. | 342/62 |

*Primary Examiner*—Charles Jordan
*Assistant Examiner*—Theresa M. Wesson
*Attorney, Agent, or Firm*—Leonard A. Alkov; Glenn H. Lenzen, Jr.

[57] ABSTRACT

A launch aircraft launches a bomb at a target and uses a radar to transmit a predefined waveform at the bomb and target. The bomb incorporates a transponder that frequency shifts the transmitted waveform and illuminates the target with a shifted waveform having a null at the center of its beam pattern. The initially transmitted waveform and frequency shifted waveform are reflected from the target and are received by the radar. The received signals are processed to generate a correction signal that is a function of the offset between the null of the frequency shifted waveform and the target location. The correction signal is transmitted to the bomb and is processed therein to correct the flight path of the bomb toward the target.

10 Claims, 2 Drawing Sheets

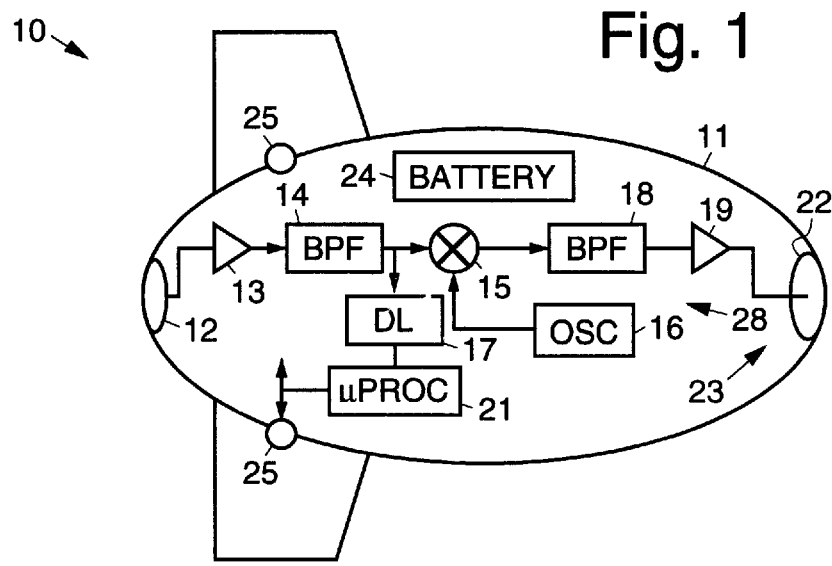
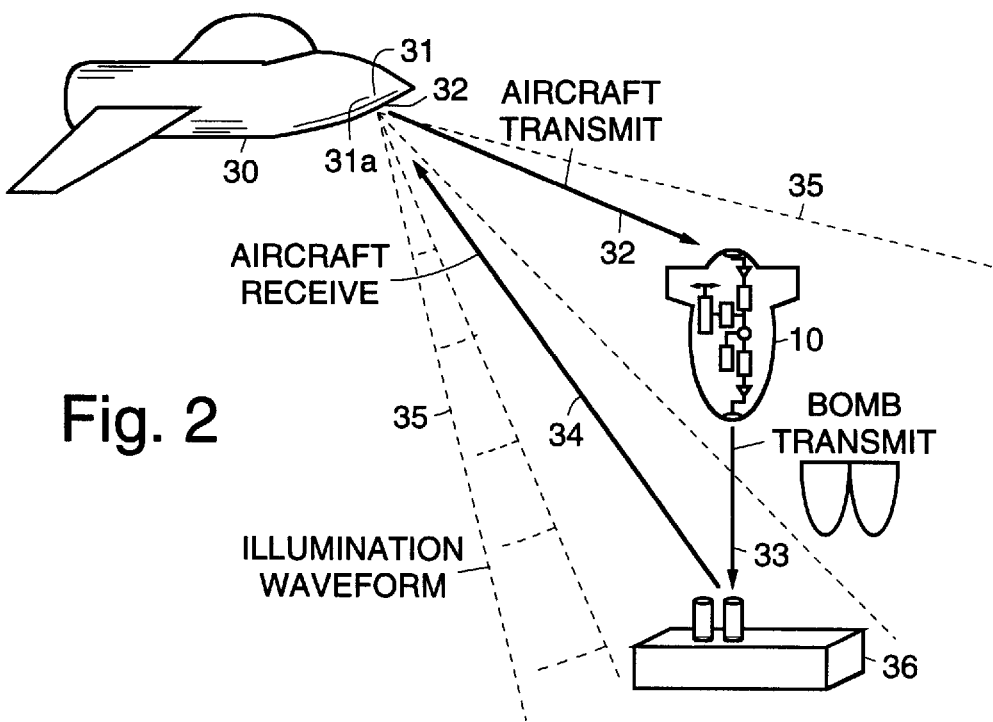

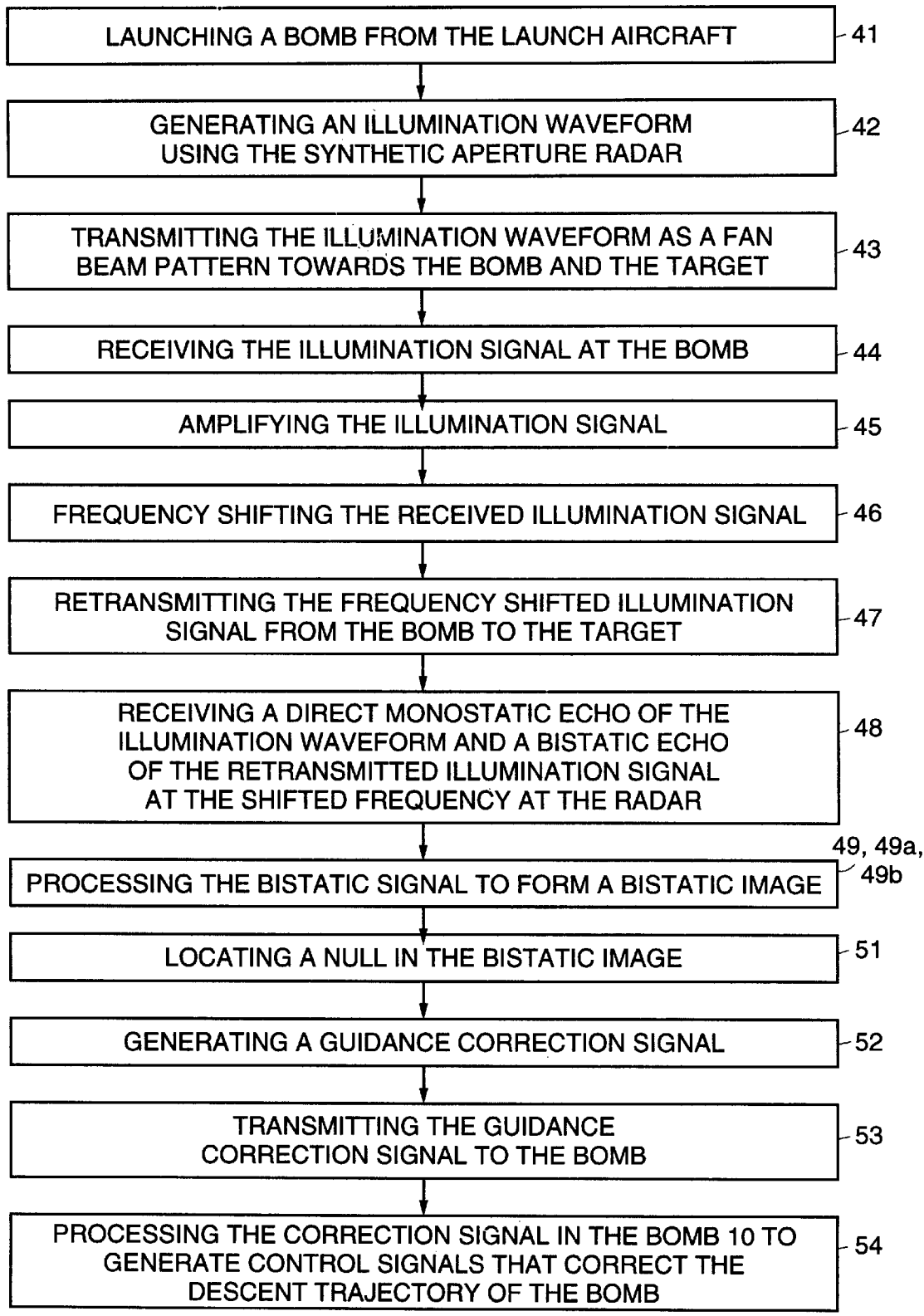

WEAPON SYSTEM EMPLOYING A TRANSPONDER BOMB AND GUIDANCE METHOD THEREOF

BACKGROUND

The present invention relates generally to weapon systems, and more particularly, to a weapon system employing a bistatic radar guided transponder bomb and guidance method therefor.

The transponder guidance concept employed in the transponder bomb of the present invention addresses one of the key problems of precision weapon delivery, which was a major difficulty in the Gulf War and is now a major difficulty in Bosnia. In particular, present day aircraft-launched high precision weapons are not "all weather" devices. Laser-guided bombs have repeatedly been stymied by low cloud cover. There have been several proposals to develop new all-weather precision air-to-ground weapons, but these proposals generally involve either adding a new sensor to the launch aircraft (in addition to the existing fire control radar) or involve using satellite-based tactical data which may not be available in an operational theater. It would therefore be an advantage to have a weapon delivery system that only requires the use of the fire control radar in the aircraft.

The concept of using a transmitted null pattern to steer a weapon is disclosed in U.S. Pat. No. 5,736,956, issued Apr. 7, 1998, entitled "Unlocked W-Band Receiver with Coherent Features" assigned to the assignee of the present invention. However, this patent application does not disclose a bistatic guidance transponder bomb concept.

Accordingly, it is an objective of the present invention to provide for an improved weapon system that uses a bistatic radar guided transponder bomb. It is another objective of the present invention to provide for guidance method for use with a bistatic radar guided transponder bomb.

SUMMARY OF THE INVENTION

To meet the above and other objectives, the present invention provides for a weapon system that employs a bistatic radar-guided transponder bomb used in conjunction with a radar system on board a launch aircraft to guide the bomb to a target. The transponder bomb employs a transponder that receives and frequency shifts an illumination signal, and retransmits the frequency shifted illumination signal at the target. The frequency shifted illumination signal has a null at a center of its signal pattern.

A data link is coupled to the transponder that receives a guidance correction signal. A processor is coupled to the data link that processes the guidance correction signal to produce control signals to guide the bomb. Fin actuation devices are coupled to the processor that guide the bomb toward the target in response to the control signals produced by the processor.

The launch aircraft 30 carries the radar which generates the illumination signal, and which is transmitted at the launched bomb and target. A radar receiver processes return signals from the target derived from the illumination signal transmitted by the radar and from the frequency shifted illumination signal retransmitted by the transponder bomb to compute the guidance correction signal. The guidance correction signal is transmitted to the bomb and is processed thereby to correct its descent trajectory to the target.

Thus, the transponder bomb is a guided, unpowered, air-to-ground weapon having a data link, and an RF seeker. The transponder bomb uses a semi-active (i.e. bistatic) guidance system and uses the seeker antenna disposed on the bomb, and an electronically scanned radar antenna disposed on the aircraft.

The novel features of the transponder guidance concept implemented in the present invention are that the bomb comprises a bistatic illuminator, and an X-band fire control radar in the aircraft comprises the bistatic receiver. Return signals from a target that are received on-board the aircraft are processed to compute a guidance correction signal. The aircraft transmits the guidance correction signal back to the bomb, which corrects its descent trajectory by means of fin actuators.

The fire control radar in the aircraft generates an illumination waveform, and transmits it to the bomb. The bomb receives the illumination waveform in a small antenna at its rear end, shifts it in frequency using an internal crystal-locked frequency source and a mixer circuit, and retransmits it through an illumination antenna mounted at the front of the bomb, which serves as the seeker. Therefore, the bomb acts as a radar transponder. Thus, in contrast to the concepts outlined in the Background section, the present transponder guidance concept requires only the fire control radar of the aircraft.

An advantage of the transponder bomb is that the electronics residing in the bomb are kept to a minimum, thus increasing affordability of the weapon. Waveform generation circuitry is not required in the bomb, since the waveform is generated in the fire control radar on the launch aircraft. Powerful signal processors are also not required in the bomb, since the aircraft fire control radar performs all signal processing needed to form syntheie aperture radar (SAR) maps and to correlate multiple SAR maps for targeting.

Another advantage of the transponder guidance concept used in the transponder bomb is that it does not require an extremely narrow illumination beam to achieve small weapon circular error probables (CEPs). The CEP of the weapon system is limited only by pilot designation accuracy and by the SAR resolution of the bistatic image. The guidance signature is provided by the antenna null pattern of the weapon seeker rather than by the antenna null pattern of the fire control radar. The weapon seeker null becomes progressively smaller and sharper on the ground as the weapon approaches a target. In particular, the accuracy of transponder bomb does not depend on either the monopulse tracking accuracy of the aircraft radar or on the beamwidth of the aircraft fire control radar. For this reason, the fire control radar can provide adequate illumination for precision targeting (providing a CEP of 10 feet) despite the fact that the antenna beamwidth of the X-band fire control radar may be quite wide.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates the design of an exemplary transponder bomb in accordance with the principles of the present invention;

FIG. 2 illustrates an operational scenario using the transponder bomb of FIG. 1; and FIG. 3 is a flow chart illustrating one method of guiding a bomb to a target in accordance with the principles of the present invention.

DETAILED DESCRIPTION

Referring to the drawing figures, FIG. 1 illustrates the design of an exemplary transponder bomb 10 in accordance with the principles of the present invention. FIG. 2 illustrates an operational scenario and the guidance concept used with the transponder bomb 10.

With reference to FIG. 1, the transponder bomb 10 has a bomb casing 11 or housing 11 that encloses a receive antenna 12 disposed at a rear end of the housing 11. The receive antenna 12 is coupled by way of a first amplifier 13 and a first band pass filter (BPF) 14 to a first input of a mixer circuit 15. A crystal-locked frequency source 16, such as a crystal oscillator 16, is coupled to a second input of the mixer circuit 15.

The frequency source 16 and mixer circuit 15 are used to frequency shift signals received by the receive antenna 12. The output of the mixer circuit is coupled by way of a second bandpass filter 18 and a second amplifier 19 to an RF seeker 23 having a seeker antenna 22 disposed at a front end of the housing 11. The seeker antenna 22 of the RF seeker 23 is constructed to output a beam pattern (shown in FIG. 2) having a null at the boresight of the seeker antenna 22 and bomb 10. The receive antenna 12, first and second amplifiers 13, 19, first and second bandpass filters 14, 18, mixer 15 and oscillator 16 form a transponder 28.

The receive antenna 12 is also coupled to a data link (DL) 17 by way of the first amplifier 13 and first band pass filter 14 whose output is coupled to a microprocessor 21. The microprocessor 21 is coupled to fin actuators 25 that control the flight path of the bomb 10 in response to output signals produced by the microprocessor 21. A battery 24 is provided that is coupled to components that require power.

Referring to FIG. 2, a launch aircraft 30 having a fire control radar 31 is used to launch the transponder bomb 10. The fire control radar 31 may be an X-band synthetic aperture radar (SAR) 31 that used to generate an illumination waveform 35 or signal 35 that is transmitted at a launched transponder bomb 10 and a target 36.

The guidance approach using the transponder bomb 10 employs a form of air-to-ground semi-active guidance. The illumination signal 35 is typically a SAR waveform 35 although it may also be a ground mover indicator (GM-II) waveform, for example.

The SAR waveform 35 or illumination signal 35 is generated by the radar 31 and it is transmitted as a fan beam pattern 34 that is created by a radar antenna 32 on the aircraft 30. The illumination signal 35 is transmitted at both the bomb 10 and the target 36. The bomb 10 receives the illumination signal 35 by way of the receive antenna 12, amplifies it, shifts it in frequency, and retransmits it at the target 36 by way of the seeker antenna 22. The antenna pattern of the seeker 23 alternates between a sum pattern and a funnel difference pattern.

Thus, the seeker antenna 22 is used to retransmit the frequency shifted signals at the target 36, identified as retransmitted frequency shifted signals 33. Therefore, the transponder bomb 10 functions as a radar transponder 28, receiving the illumination waveform 35 from the fire control radar 31 in the launch aircraft 30 and retransmitting the frequency shifted signals 33 at the target 36.

The fire control radar 31 in the aircraft 30 also comprises a bistatic receiver 31a. The fire control radar 31 in the aircraft 30 forms a SAR bistatic image which is a "bomb's eye view" of the target 36.

The fire control radar 31 forms the SAR bistatic image using the following steps. On receive, the bistatic receiver 31a on the aircraft 30 uses a pencil beam pattern aimed at the target 36 to receive both its direct monostatic echo (at its original transmit frequency) and a bistatic echo at the shifted frequency generated and retransmitted by the bomb 10 (the frequency shifted signal 33). The aircraft receiver 31a processes the bistatic signal instead of, or in addition to, the monostatic signal. It does this by (a) shifting its oscillator signal to match the bistatic frequency shift or (b) digitizing the bistatic signal at a high enough sample rate so that it can process both the monostatic and bistatic signals without aliasing, allowing simultaneous formation of monostatic and bistatic images.

A pilot of the aircraft 30 uses a sum SAR map and a funnel difference SAR map to locate a null in the image. By definition, the null is the intercept of the line-of-sight of the seeker 23 in the bomb 10 and the earth. Ideally, the null should be directly on the target 36. A pixel in the SAR map containing the target 36 is initially located by pilot designation and thereafter by cross-registration of successive bistatic images. The difference vector between the pixel containing the null and the target pixel in the bistatic SAR image is converted to an angle pointing error, which is converted into the guidance correction signal 32.

Return signals from the target 36 that are received by the bistatic receiver 31a on-board the aircraft 30 are processed to compute a guidance correction signal 32. The fire control radar 31 in the aircraft 30 transmits the guidance correction signal 32 to the bomb 10 by way of the data link 17. The data link 17 function need not be implemented by separate data link hardware. The data link 17 function may be achieved in the radar band by transmitting modulated pulses to the receive antenna 12 in the bomb 10 in between SAR maps. The microprocessor 21 processes the correction signal 32 to correct the descent trajectory of the bomb 10 by means sending control signals to the fin actuators 25. A numerical example of the guidance scheme is given below.

In order to keep the transponder bomb 10 relatively inexpensive, the seeker antenna 22 is relatively simple. A continuous transverse stub (CTS) planar array may be used as the seeker antenna 22, and which provides a simple conical scan acquisition pattern without the use of electronic steering or a spinning gimbal. The second most expensive component is typically the crystal oscillator 16 which (by driving the mixer circuit 15) imparts a fixed frequency shift to the received illumination signal 35. The oscillator 16 need not be "super-stable", thus avoiding design complications. A fixed absolute frequency error can be corrected in the fire control radar 31 by imparting a frequency shift correction. A frequency drift can be detected and corrected in the fire control radar 31 in the aircraft 30 using autofocus processing with a large quadratic phase acquisition window.

The basic feasibility of using a transponder 28 (such as is employed in the present transponder bomb 10) as an air-to-ground weapon seeker is supported by evaluation of transponder clutter-to-noise (CNR) ratio. The clutter-to-noise (CNR) ratio is given as follows:

$$CNR = (P_{TX} PCR\, N_P\, G_{AC\text{-}TX} G_{AC\text{-}RCV}\, \lambda_2^2 \eta\, \sin(\theta_{DEP})\, d_R^2/(4\pi)^3\, R_{AC\text{-}TO\text{-}TARG}^4\, (1+\beta) kT\, BW\, F_{AC}\, L_{AC\text{-}TX}\, L_{AC\text{-}RCV}) \times (\lambda_1^2\, A,\, G_{BOMB\text{-}RCV}\, G_{TRANSPONDER}\, G_{BOMB\text{-}TX}/(4\pi)^2\, (R_{AC\text{-}TO\text{-}BOMB}/(4\pi)^2 (R_{AC\text{-}TO\text{-}BOMB}/R_{BOMB\text{-}TO\text{-}TARG})^2 R_{BOMB\text{-}TO\text{-}TARG}^2 L_{BOMB\text{-}RCV} L_{BOMB\text{-}TX})$$

where $P_{TX}$ = transmit peak power of the radar $N_P$ = number of pulses integrated $G_{AC\text{-}RCV}$ = gain of aircraft receive antenna pattern $G_{AC-TX}$=gain of aircraft transmit antenna pattern $G_{BOMB-RCV}$=gain of bomb receiver $G_{BOMB-TX}$=gain of bomb seeker transmit pattern $G_{TRANSPONDER}$=gain of transponder amplifier $L_{AC-TX}$=transmit losses of aircraft $L_{AC-RCV}$=receive losses of aircraft $L_{BOMB-TX}$=transmit losses of bomb $L_{BOMB-RCV}$=receive losses of bomb $\lambda$=transmit wavelength of aircraft $\eta$=cross sectional density of clutter $d_R$=resolution of SAR waveform BW=bandwidth of SAR waveform $F_{AC}$=noise figure of aircraft radar receiver $R_{AC-TO-TARG}$=range from aircraft to clutter (or target)

$R_{AC-TO-BOMB}$=range from aircraft to bomb $R_{BOMB-TO-TARG}$=range from bomb to clutter PCR=pulse compression ratio of signal processing $\lambda_2$=transmit wavelength of bomb $\theta_{DEP}$=depression angle from aircraft to clutter $\beta$=additional noise figure due to bomb (~0), and kT=Boltzman's constant.

Representative values for these parameters are given in table 1, which also shows that a 4 dB CNR is achieved, which is a typical operating value for synthetic aperture radar systems.

Table I illustrates representative parameters for a transponder bomb delivery.

TABLE I

| Parameter | value | dB |
|---|---|---|
| $P_{PK}$ (aircraft radar peak power - watts) | 8000 | 39.03 |
| $G_{AC}$ (aircraft antenna gain - dB) | 34 | 34.00 |
| $G_{BOMB-RCV}$ (bomb receiver gain - dB) | 0 | 0.00 |
| $G_{TRANSPONDER}$ (dB) | 40 | 40 |
| $\lambda_{TX}$ (ac transmit wavelength - feet) | 0.1 | −20.00 |
| $\lambda_{TX}$ (bomb transmit wavelength - feet) | 0.09 | −20.92 |
| $d_{SEEKER}$ (seeker antenna diameter - inches) | 12 | |
| $G_{SEEKER}$ (seeker antenna gain - dB) | 29.89 | 29.89 |
| $d_R$ (resolution size - feet) | 10 | |
| q (clutter cross section spatial density) | 0.15 | |
| σ (clutter cross section - square feet) | 6.8 | 8.31 |
| aircraft altitude (feet) | 25000 | |
| bomb altitude (feet) | 10000 | |
| $R_{AC-TO-TARG}$ (aircraft to target range - nmi) | 10 | 47.84 |
| $R_{AC-TO-BOMB}$ (aircraft to bomb range - nmi) | 9.4 | 47.59 |
| $R_{BOMB-TO-TARG}$ (bomb to target range - nmi) | 1.6 | 40.00 |
| BW (transmit waveform bandwidth - MHz) | 98.4 | 79.93 |
| pcr (pulse compression ratio) | 12152 | 40.85 |
| $\theta_{SQUINT-AC}$ (aircraft squint angle - degrees) | 30 | |
| $V_{AC}$ (aircraft speed - feet/sec) | 1000 | |
| array time (seconds) | 1.09 | |
| duty factor | 0.2 | |
| prf (effective pulse repetition frequency) | 3071.783866 | |
| n pulses (number of pulses) | 3360 | 35.26 |
| kT (dB) | 204 | 204.00 |
| $NF_{AC}$ (aircraft noise figure) | 2.5 | 3.98 |
| $NF_{BOMB}$ (transponder noise figure) | 35 | 5.44 |
| $NF_{RATIO}$ (ratio of bomb NF to aircraft NF) | 1.4 | 1.46 |
| 4π | | 10.99 |
| $L_{AC-TX}$ (aircraft transmitter loss - dB) | 1.5 | 1.50 |
| $L_{AC-RCV}$ (aircraft receiver loss - dB) | 2 | 2 |
| $L_{BOMB-RCV}$ (bomb receive lose - dB) | 3 | 3 |
| $L_{BOMB-TX}$ (bomb transmit loss) | 2 | 2 |
| $L_{AC-SPOIL}$ (aircraft transmit beam spoiling loss) | 7 | 7 |
| $L_{ATM}$ (atmospheric loss) | 0.5 | 0.5 |
| $L_{PROCESSING}$ (SAR processing loss) | 2 | 2 |
| noise figure degradation | | 0.00 |

TABLE I-continued

| Parameter | value | dB |
|---|---|---|
| transponder loss | | −56.60 |
| bistatic CNR | | 4.66 |

The present invention also provides for a method 40 of guiding a bomb 10 to a target 36. FIG. 3 is a flow chart illustrating one such method 40. The exemplary method 40 comprises the following steps. A bomb 10 in accordance with the present invention is launched 41 by a launch aircraft 30. A synthetic aperture radar 31 is used to generate 42 an illumination waveform 35. The illumination waveform 35 is transmitted 43 as a fan beam pattern 34 at both the bomb 10 and the target 36. The illumination signal 35 is received 44 at the bomb 10 (using a receive antenna 12). The illumination signal 35 received at the bomb 10 is amplified 45 if necessary, and frequency shifted 46. The frequency shifted illumination signal 35 then retransmitted 47 at the target 36 (using a seeker antenna 22). The retransmitted illumination signal 35 alternates between a sum pattern and a funnel difference pattern.

A fire control radar 31 forms a bistatic image using the following steps. A fire control radar 31 receives 48 both its direct monostatic echo of the illumination waveform 35 (at the original transmit frequency) and a bistatic echo of the retransmitted illumination signal 35 at the shifted frequency generated by the bomb 10. The radar 31 processes 49 the bistatic signal by (a) shifting 49a its oscillator signal to match the bistatic frequency shift or (b) digitizing 49b the bistatic signal at a sample rate high enough to process both the monostatic and bistatic signals without aliasing, allowing simultaneous formation of monostatic and bistatic images.

The pilot of the aircraft 30 uses a sum SAR map and a funnel difference SAR map to locate 51 a null in the image. A difference vector between the pixel containing the null and the target pixel in the bistatic SAR image is converted 52 to a guidance correction signal 32. The radar 31 transmits 53 the guidance correction signal 32 to the bomb 10. The correction signal 32 is processed 54 in the bomb 10 to generate control signals that are coupled the fin actuators 25 correct the descent trajectory of the bomb 10.

Thus, an improved transponder bomb has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A weapon system for guiding a bomb to a target, said system comprising: a transponder bomb comprising:

transponder means for receiving an illumination signal, for frequency shifting the illumination signal, and for retransmitting the frequency shifted illumination signal at the target, said frequency shifted illumination signal has a null at a center of its signal pattern;

a data link for receiving a guidance correction signal;

a processor coupled to the data link for processing the guidance correction signal to produce control signals to guide the bomb; and fin actuation means coupled to the processor for guiding the bomb toward the target in response to the control signals produced by the processor; and a launch aircraft for launching the bomb that comprises:

a radar for generating the illumination signal, which signal is transmitted at the launched bomb and at the target; and receiver means for processing return signals from the target derived from the illumination signal transmitted by the radar and from the frequency shifted illumination signal retransmitted by the transponder bomb to compute a guidance correction signal, and wherein the guidance correction signal is transmitted to the bomb and is processed thereby to correct the bomb's descent trajectory to the target.

2. The weapon system of claim 1 wherein the transponder means comprises:

a receive antenna;

a mixer circuit having a first input coupled to the receive antenna;

a frequency source coupled to a second input of the mixer circuit; and an RF seeker having a seeker antenna coupled to an output of the mixer circuit.

3. The weapon system of claim 2 wherein the transponder bomb further comprises a first amplifier and a first band pass filter coupled between the receive antenna and the first input of the mixer circuit.

4. The weapon system of claim 3 wherein the transponder bomb further comprises a second bandpass filter and a second amplifier coupled between the output of the mixer circuit and the seeker antenna.

5. The weapon system of claim 1 wherein the transponder bomb further comprises a battery for providing power to selected components of the bomb.

6. The weapon system of claim 1 wherein the radar comprises an X-band synthetic aperture radar.

7. A method of guiding a bomb from a launch aircraft having a synthetic aperture radar to a target, said method comprising the steps of:

launching a bomb from the launch aircraft;

generating an illumination waveform using the synthetic aperture radar;

transmitting the illumination waveform as a fan beam pattern towards the bomb and the target;

receiving the illumination waveform at the bomb;

frequency shifting the received illumination waveform;

retransmitting the frequency shifted illumination waveform from the bomb to the target;

receiving a direct monostatic echo of the illumination waveform and a bistatic echo of the retransmitted illumination waveform at the shifted frequency;

processing the bistatic echo to form a bistatic image;

locating a null in the bistatic image;

generating a guidance correction signal;

transmitting the guidance correction signal to the bomb; and processing the correction signal in the bomb to generate control signals that correct the descent trajectory of the bomb.

8. The method of claim 7 wherein the step of retransmitting the frequency shifted illumination waveform comprises the step of:

retransmitting a frequency shifted illumination signal that alternates between a sum pattern and a funnel difference pattern.

9. The method of claim 7 wherein the step of processing the bistatic echo comprises the step of:

shifting an oscillator signal of the radar to match the frequency shift.

10. The method of claim 7 wherein the step of processing the bistatic echo comprises the step of:

digitizing the bistatic echo at a sample rate high enough to process both the monostatic and bistatic echos without aliasing, allowing simultaneous formation of monostatic and bistatic images.

* * * * *